United States Patent
Yang et al.

(10) Patent No.: US 11,934,488 B2
(45) Date of Patent: Mar. 19, 2024

(54) METHOD AND SYSTEM FOR CONSTRUCTING DIGITAL ROCK

(71) Applicant: CHINA UNIVERSITY OF PETROLEUM (EAST CHINA), Shandong (CN)

(72) Inventors: Yongfei Yang, Shandong (CN); Fugui Liu, Shandong (CN); Jun Yao, Shandong (CN); Huaisen Song, Shandong (CN); Kai Zhang, Shandong (CN); Lei Zhang, Shandong (CN); Hai Sun, Shandong (CN); Wenhui Song, Shandong (CN); Yuanbo Wang, Shandong (CN); Bozhao Xu, Shandong (CN)

(73) Assignee: China University of Petroleum (East China), Shandong (CN)

( * ) Notice: Subject to any disclaimer, the term of this patent is extended or adjusted under 35 U.S.C. 154(b) by 412 days.

(21) Appl. No.: 17/295,493

(22) PCT Filed: Sep. 10, 2020

(86) PCT No.: PCT/CN2020/114481
§ 371 (c)(1),
(2) Date: May 20, 2021

(87) PCT Pub. No.: WO2021/179558
PCT Pub. Date: Sep. 16, 2021

(65) Prior Publication Data
US 2022/0101055 A1    Mar. 31, 2022

(30) Foreign Application Priority Data
Mar. 13, 2020 (CN) .......................... 202010175137

(51) Int. Cl.
*G06F 18/214* (2023.01)
*G06N 3/045* (2023.01)
(Continued)

(52) U.S. Cl.
CPC ......... *G06F 18/2148* (2023.01); *G06N 3/045* (2023.01); *G06N 3/088* (2013.01);
(Continued)

(58) Field of Classification Search
CPC .... G06F 18/2148; G06N 3/045; G06N 3/088; G06N 3/048; G06N 3/08; G06T 5/002;
(Continued)

(56) References Cited

U.S. PATENT DOCUMENTS

| 2019/0198156 A1 | 6/2019 | Madani et al. |
| 2020/0183047 A1* | 6/2020 | Denli .................. G06N 3/08 |
| 2021/0190664 A1* | 6/2021 | Duke .................. G06T 3/4007 |

FOREIGN PATENT DOCUMENTS

| CN | 107609587 A | 1/2018 |
| CN | 108876901 A | 11/2018 |

(Continued)

OTHER PUBLICATIONS

International Search Report by China Patent Office for counterpart application PCT/CN2020/114481 filed Sep. 10, 2020, dated Dec. 16, 2020 (5 pages).

*Primary Examiner* — Chan S Park
*Assistant Examiner* — Daniel C Chang
(74) *Attorney, Agent, or Firm* — Capitol City TechLaw, PLLC; Samuel P. Burkholder

(57) ABSTRACT

The present disclosure provides a method and system for constructing a digital rock, and relates to the technical field of digital rocks. According to the method, a three-dimensional (3D) digital rock image that can reflect real rock information is obtained using an image scanning technology,
(Continued)

and the image is preprocessed to obtain a digital rock training image for training a generative adversarial network (GAN). The trained GAN is stored to obtain a digital rock construction model. The stored digital rock construction model can be directly used to quickly construct a target digital rock image. This not only greatly reduces computational costs, but also reduces costs and time consumption for obtaining high-resolution sample images. In addition, the constructed target digital rock image can also reflect real rock information.

8 Claims, 10 Drawing Sheets

(51) Int. Cl.
*G06N 3/088* (2023.01)
*G06T 5/00* (2006.01)
*G06T 7/11* (2017.01)
*G06T 7/62* (2017.01)

(52) U.S. Cl.
CPC .................. *G06T 5/70* (2024.01); *G06T 7/11* (2017.01); *G06T 7/62* (2017.01); *G06T 2207/20021* (2013.01); *G06T 2207/20081* (2013.01); *G06T 2207/20084* (2013.01); *G06T 2207/20152* (2013.01)

(58) Field of Classification Search
CPC ... G06T 7/11; G06T 7/62; G06T 2207/20021; G06T 2207/20081; G06T 2207/20084; G06T 2207/20152; G06T 2207/10061; G06T 2207/10081; G06T 2207/20076; G06T 7/143; G06V 20/10; G06V 20/95; G06V 10/82
See application file for complete search history.

(56) References Cited

FOREIGN PATENT DOCUMENTS

| | | |
|---|---|---|
| CN | 109584337 A | 4/2019 |
| CN | 110009706 A | 7/2019 |

* cited by examiner

METHOD AND SYSTEM FOR CONSTRUCTING DIGITAL ROCK

CROSS-REFERENCE TO RELATED APPLICATIONS

This application is a U.S. National Stage Application under 35 U.S.C § 371 of International Application No. PCT/CN2020/114481 filed Sep. 10, 2020, which claims the benefit of priority to Chinese Patent Application No. 202010175137.6 filed Mar. 13, 2020, entitled "METHOD AND SYSTEM FOR CONSTRUCTING DIGITAL ROCK", the disclosures of all of which are hereby incorporated by reference in their entities.

TECHNICAL FIELD

The present disclosure relates to the technical field of digital rocks, and in particular, to a method and system for constructing a digital rock.

BACKGROUND

Based on a physical experiment method or a numerical reconstruction means, digital rock technologies can be used to reproduce complex pore space and establish a model that effectively characterizes a complex pore structure of a porous medium, so that rock samples can be visualized and quantified. Further, the digital rock technologies can be used to conduct flow simulation in a reconstructed digital rock and pore network model. Data necessary for oil and gas field development can be obtained using the digital rock technologies, thereby providing theoretical guidance and technical support for efficient development of unconventional oil and gas resources. The digital rock technologies become one of existing technologies and methods necessary for unconventional oil and gas development. However, it is highly difficult to obtain rocks of shale, carbonate rocks, and some deep formations, rock obtaining costs are high, and obtained rock samples are extremely precious. Therefore, with the support of existing experimental instruments and theories, an existing method for constructing a digital rock has the problems of high costs and long time required for obtaining a high-resolution sample image.

SUMMARY

The present disclosure aims to provide a method and system for constructing a digital rock, to solve the problems of high costs and long time required for obtaining a high-resolution sample image based on an existing method for constructing a digital rock.

To achieve the above objective, the present disclosure provides the following solutions:

A method for constructing a digital rock includes:
obtaining a digital rock training image, where the digital rock training image is a digital rock sample image of a known rock;
segmenting the digital rock training image into a plurality of sub-samples, and storing all the sub-samples as a sample set;
training a generative adversarial network (GAN) using the sample set and a random sample noise to obtain a digital rock construction model, where the digital rock construction model is the GAN trained using the sample set and the random sample noise, and the digital rock construction model is configured to construct a target digital rock image;
obtaining a target random noise; and
inputting the target random noise into the digital rock construction model to obtain the target digital rock image.

Optionally, the obtaining a digital rock training image specifically includes:
scanning the known rock using an image scanning technology to obtain a grayscale image of the known rock;
extracting a representative elementary volume (REV) from the center of the grayscale image of the known rock, and smoothing the REV to obtain a smooth digital rock image; and
segmenting the smooth digital rock image using a watershed segmentation method to obtain the digital rock training image.

Optionally, the training a GAN using the sample set and a random sample noise to obtain a digital rock construction model specifically includes:
obtaining an activation function and a loss function of the GAN, where the GAN includes a generator network and a discriminator network;
inputting the random sample noise into the generator network to obtain a lake sample set, where the fake sample set includes a plurality of first fake digital rock images;
training the discriminator network using the lake sample set and the sample set to obtain a discriminator network model, where the discriminator network model is the trained discriminator network, the input of the discriminator network model is the first fake digital rock image, and output is a real or fake probability value of the first fake digital rock image; and
using the random sample noise as input, and training the generator network using the discriminator network model to obtain a generator network model, where the generator network model is the trained generator network, the output of the generator network model is the target digital rock image, and the discriminator network model and the generator network model constitute the digital rock construction model.

Optionally, the discriminator network includes a discriminator input layer, discriminator intermediate layers, and a discriminator output layer;
the generator network includes a generator input layer, generator intermediate layers, and a generator output layer, where the generator input layer is a fully connected layer, and the generator intermediate layer and the generator output layer are both micro-step convolutional layers;
the activation function includes an activation function of the discriminator intermediate layer, an activation function of the discriminator output layer, an activation function of the generator intermediate layer, and an activation function of the generator output layer; the activation function of the discriminator intermediate layer is a LeakyReLu activation function, the activation function of the discriminator output layer is a Sigmoid activation function, the activation function of the generator intermediate layer is a ReLu activation function, and the activation function of the generator output layer is a Tanh activation function; and
the loss function includes a discriminator loss function of the discriminator network and a generator loss function of the generator network.

Optionally, the training the discriminator network using the fake sample set and the sample set to obtain a discriminator network model specifically includes:

extracting N sub-samples from the sample set, and inputting them into the discriminator network to calculate a first discriminator loss function;

calculating a first discriminator gradient of each layer of the discriminator network using the first discriminator loss function;

extracting N first fake digital rock images from the fake sample set, and inputting them into the discriminator network to calculate a second discriminator loss function;

calculating a second discriminator gradient of each layer of the discriminator network using the second discriminator loss function;

adding the first discriminator loss function and the second discriminator loss function to obtain the discriminator loss function; and optimizing the discriminator loss function using the first discriminator gradient, the second discriminator gradient, and a mini-batch gradient descent algorithm to obtain optimal discriminator network parameters, and obtaining the discriminator network model based on the optimal discriminator network parameters, where discriminator network parameters are a weight and a bias of each layer of the discriminator network.

Optionally, the using the random sample noise as input, and training the generator network using the discriminator network model to obtain a generator network model specifically includes:

inputting the random sample noise into the generator network to generate a first fake sample;

inputting the first fake sample into the discriminator network model, and calculating a first loss function according to formula Loss_S1=lg(D(G(z,θ),α)), where Loss_S1 denotes the first loss function, D(•) denotes the discriminator network model, G(•) denotes the generator network, z denotes the random sample noise, α denotes the discriminator network parameters, and θ denotes generator network parameters;

calculating a generator gradient of each layer of the generator network using the first loss function; and optimizing the generator loss function using the generator gradient and the mini-batch gradient descent algorithm; going back to the step of "inputting the random sample noise into the generator network to generate a first fake sample" for iteration until the number of iterations reaches a predetermined value or a real or fake probability value of the discriminator network model is a predetermined real or fake probability value; when the number of iterations reaches the predetermined value or the real or fake probability value is the predetermined real or fake probability value, determining corresponding generator network parameters as optimal generator network parameters; and obtaining the generator network model based on the optimal generator network parameters, where the generator network parameters are a weight and a bias of each layer of the generator network.

A system for constructing a digital rock includes:

a digital rock training image module, configured to obtain a digital rock training image, where the digital rock training image is a digital rock sample image of a known rock;

a sample set module, configured to segment the digital rock training image into a plurality of sub-samples, and store all the sub-samples as a sample set;

a digital rock model module, configured to train a generative adversarial network (GAN) using the sample set and a random sample noise to obtain a digital rock construction model, where the digital rock construction model is the GAN trained using the sample set and the random sample noise, and the digital rock construction model is configured to construct a target digital rock image;

an obtaining module, configured to obtain a target random noise; and a target digital rock image module, configured to input the target random noise into the digital rock construction model to obtain the target digital rock image.

Optionally, the digital rock training image module specifically includes:

a scanning unit, configured to scan the known rock using an image scanning technology to obtain a grayscale image of the known rock;

a smoothing unit, configured to extract a representative elementary volume (REV) from the center of the grayscale image of the known rock, and smooth the REV to obtain a smooth digital rock image; and a segmentation unit, configured to segment the smooth digital rock image using a watershed segmentation method to obtain the digital rock training image.

Optionally, the digital rock model module specifically includes:

an obtaining unit, configured to obtain an activation function and a loss function of the GAN, where the GAN includes a generator network and a discriminator network;

a fake sample set unit, configured to input the random sample noise into the generator network to obtain a fake sample set, where the fake sample set includes a plurality of first fake digital rock images;

a discriminator network model unit, configured to train the discriminator network using the fake sample set and the sample set to obtain a discriminator network model, where the discriminator network model is the trained discriminator network, the input of the discriminator network model is the first fake digital rock image, and output is a real or fake probability value of the first fake digital rock image; and a digital rock construction model unit, configured to use the random sample noise as input, and train the generator network using the discriminator network model to obtain a generator network model, where the generator network model is the trained generator network, the output of the generator network model is the target digital rock image, and the discriminator network model and the generator network model constitute the digital rock construction model.

Optionally, the discriminator network model unit specifically includes:

a first discriminator loss function subunit, configured to extract N sub-samples from the sample set, and input them into the discriminator network to calculate a first discriminator loss function;

a first discriminator gradient subunit, configured to calculate a first discriminator gradient of each layer of the discriminator network using the first discriminator loss function;

a second discriminator loss function subunit, configured to extract N first fake-digital rock images from the fake sample set, and input them into the discriminator network to calculate a second discriminator loss function;

a second discriminator gradient subunit, configured to calculate a second discriminator gradient of each layer of the discriminator network using the second discriminator loss function:

a discriminator loss function subunit, configured to add the first discriminator loss function and the second discriminator loss function to obtain the discriminator loss function; and a discriminator network model subunit, configured to optimize the discriminator loss function using the first discriminator gradient, the second discriminator gradient, and a mini-batch gradient descent algorithm to obtain optimal discriminator network parameters, and obtain the discriminator network model based on the optimal discriminator network parameters, where discriminator network parameters are weight and bias of each layer of the discriminator network.

According to specific embodiments of the present disclosure, the present disclosure has the following technical effects:

The present disclosure provides a method and system for constructing a digital rock. The method includes: obtaining a digital rock training image, where the digital rock training image is a digital rock sample image of a known rock; segmenting the digital rock training image into a plurality of sub-samples, and storing all the sub-samples as a sample set; training a generative adversarial network (GAN) using the sample set and a random sample noise to obtain a digital rock construction model, where the digital rock construction model is the GAN trained using the sample set and the random sample noise, and the digital rock construction model is configured to construct a target digital rock image; obtaining a target random noise; and inputting the target random noise into the digital rock construction model to obtain the target digital rock image. According to the method, the target digital rock image is established using a GAN model, the trained digital rock construction model for constructing the target digital rock image is stored, and the stored digital rock construction model can be directly used to quickly construct the target digital rock image. This greatly reduces computational costs and reduces costs and time for obtaining a high-resolution sample image.

In addition, image scanning technologies such as a computed tomography (CT) scan technology and a focused ion beam scanning electron microscope (FIB-SEM) are combined to improve the authenticity and accuracy of the constructed target digital rock image. For experiments on rock samples such as shale and deep oil and gas reservoirs that are difficult to coring, the combination can reduce coring costs and has important value in practical application.

BRIEF DESCRIPTION OF DRAWINGS

To describe the technical solutions in the embodiments of the present disclosure or the prior art more clearly, the following briefly describes the accompanying drawings to be used in the embodiments. Apparently, the accompanying drawings in the following description show merely some embodiments of the present disclosure, and a person of ordinary skill in the art may still derive other drawings from these accompanying drawings without creative efforts.

FIG. 2 illustrates a two-dimensional (2D) grayscale image of a rock according to an embodiment of the present disclosure, where

FIG. 3 is a diagram of a representative elementary volume (REV) according to an embodiment of the present disclosure, where

FIG. 4 illustrates 2D display diagrams according to an embodiment of the present disclosure, where

FIG. 6 illustrates a target digital rock image according to an embodiment of the present disclosure, where

DETAILED DESCRIPTION

Technical solutions in the embodiments of the present disclosure are clearly and completely described below concerning the accompanying drawings in the embodiments of the present disclosure. Apparently, the described embodiments are merely some rather than all embodiments of the present disclosure. All other embodiments obtained by a person of ordinary skill in the art based on the embodiments of the present disclosure without creative efforts shall fall within the protection scope of the present disclosure.

An objective of the present disclosure is to provide a method and system for constructing a digital rock, thereby resolving the problems of high costs and long time required for obtaining a high-resolution sample image in an existing method for constructing a digital rock.

To make the objective, features, and advantages of the present disclosure more obvious and comprehensive, the following further describes in detail the present disclosure with reference to the accompanying drawings and specific implementations.

Figure 1:
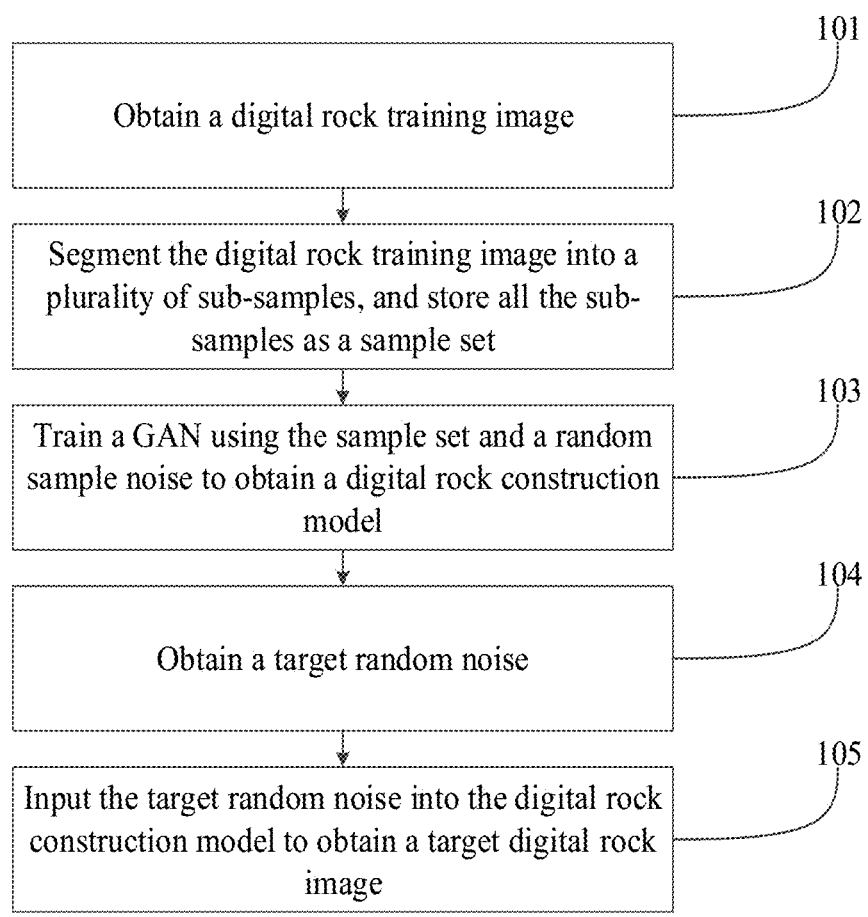
FIG. 1 is a flowchart of a method for constructing a digital rock according to an embodiment of the present disclosure.

An embodiment provides a method for constructing a digital rock. FIG. 1 is a flowchart of a method for constructing a digital rock according to the embodiment of the present disclosure. Referring to FIG. 1, the method for constructing a digital rock includes the following steps:

Step 101: obtain a digital rock training image, where the digital rock training image is a digital rock sample image of a known rock.

Figure 2A:
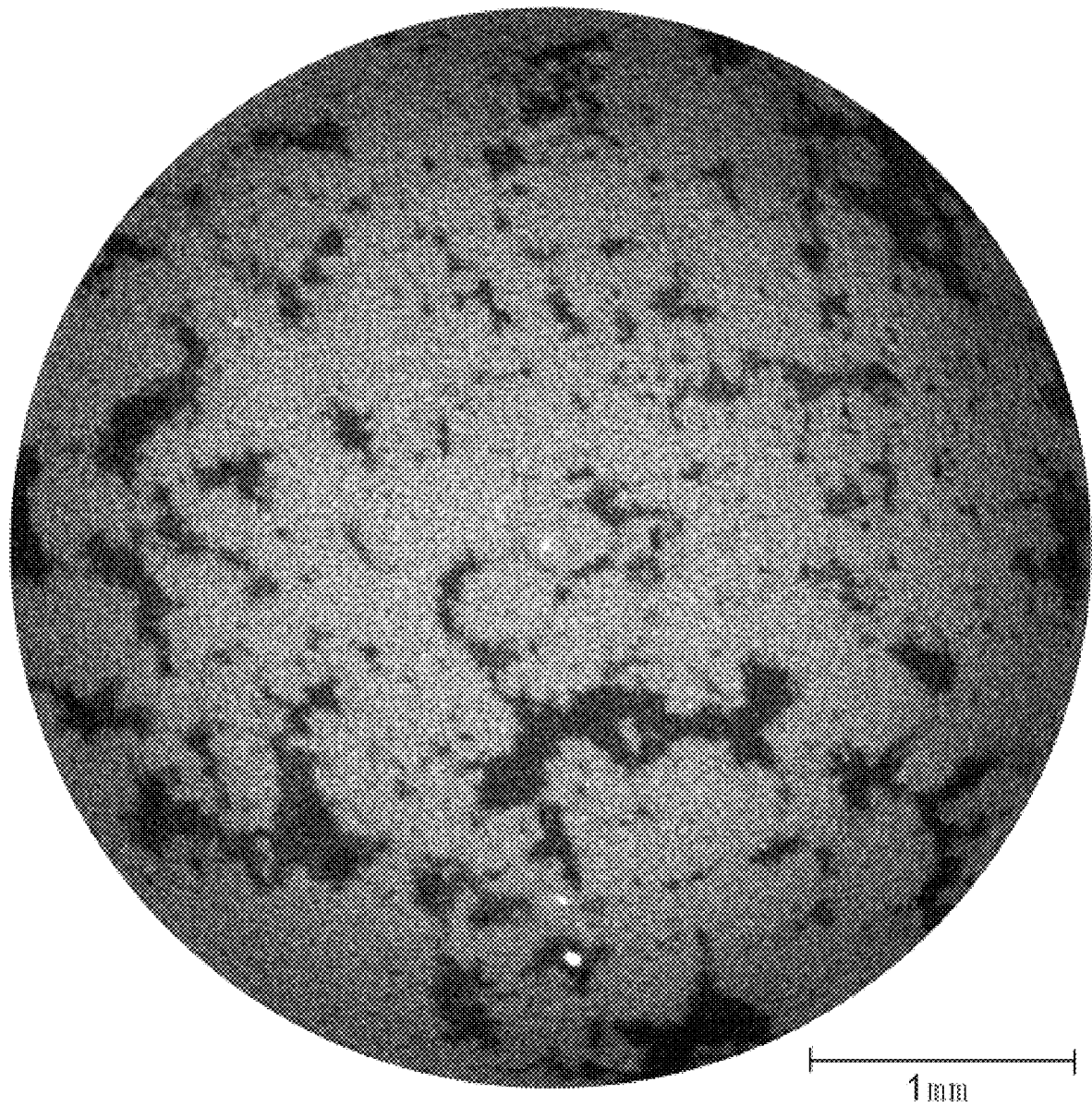
FIG. 2A illustrates a 2D grayscale image of the rock and FIG. 2B illustrates a three-dimensional (3D) grayscale image of the rock.
Figure 2B:

Step 101 may specifically include the following:

(1) Scan the known rock using an image scanning technology to obtain a grayscale image of the known rock. The image scanning technology includes using devices such as a computed tomography (CT) scanning device and a focused ion beam scanning electron microscope (FIB-SEM) to conduct image scanning. A scanning resolution in this embodiment is p micrometers (μm). The grayscale image of the rock includes a two-dimensional (2D) grayscale image of the rock and a three-dimensional (3D) grayscale image of the rock, as shown in FIG. 2A and FIG. 2B.

Figure 3A:
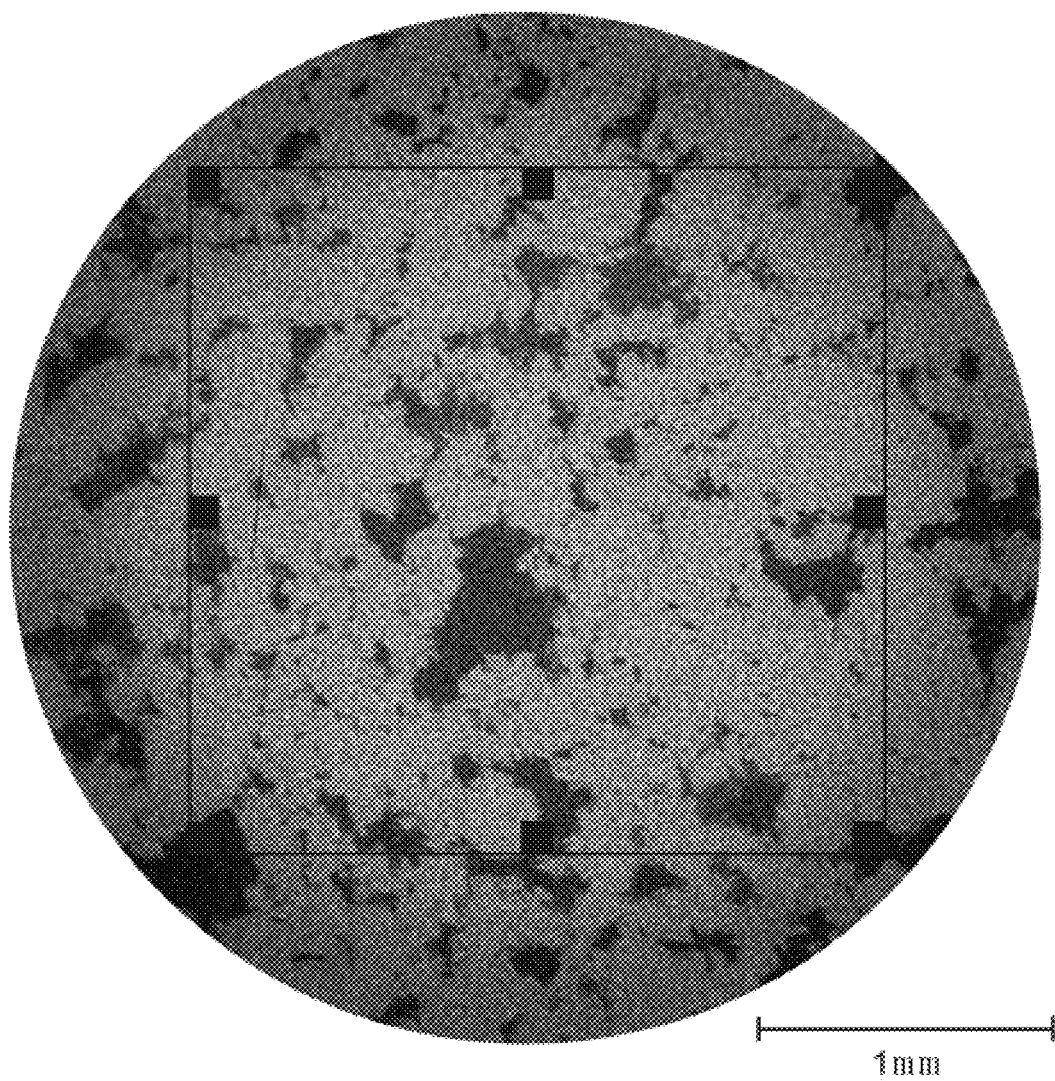
FIG. 3A is a diagram of extracting a 400*400*400-pixel REV.
Figure 3B:
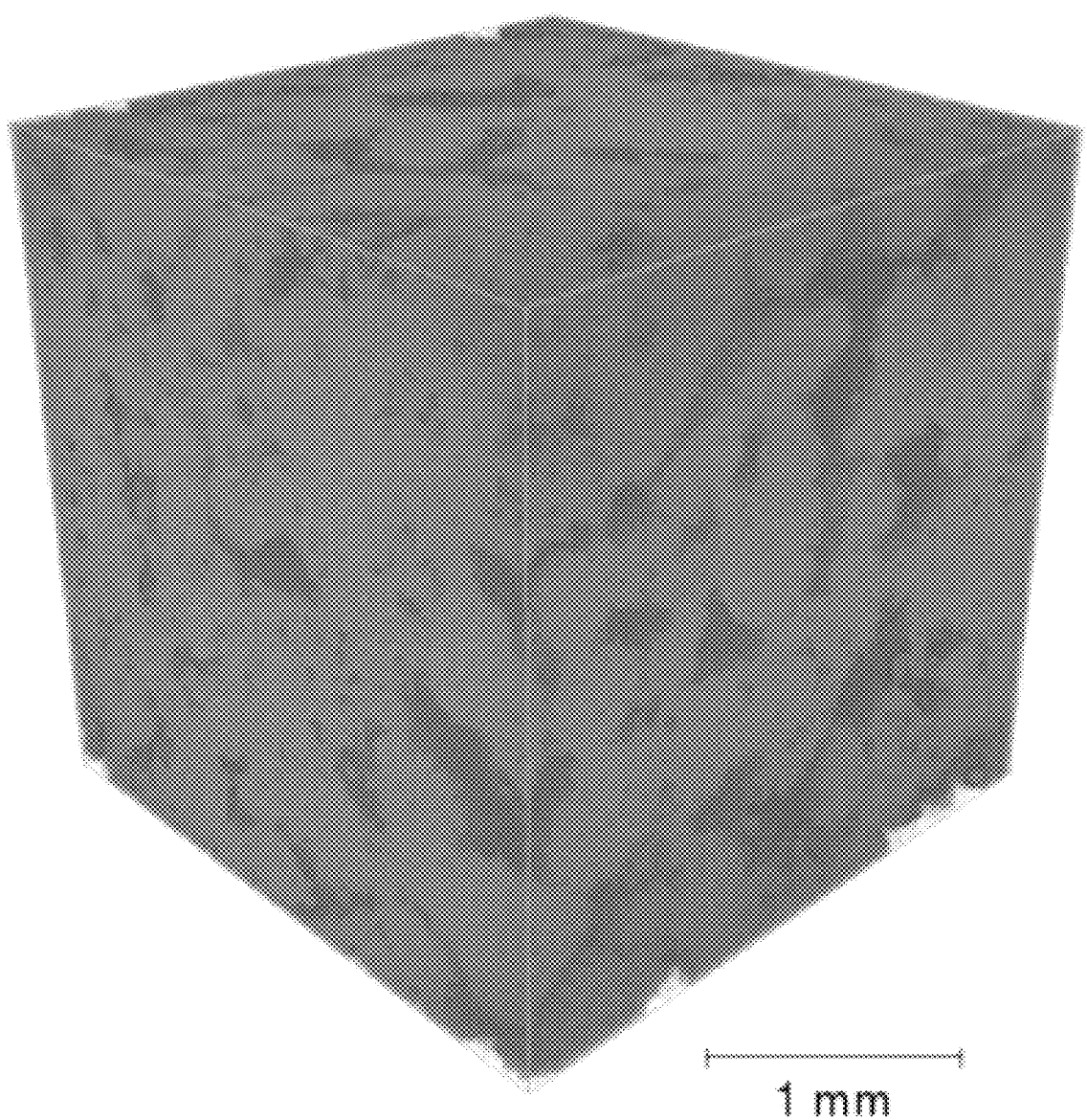
FIG. 3B is a 3D display diagram of the extracted REV.
Figure 4A:
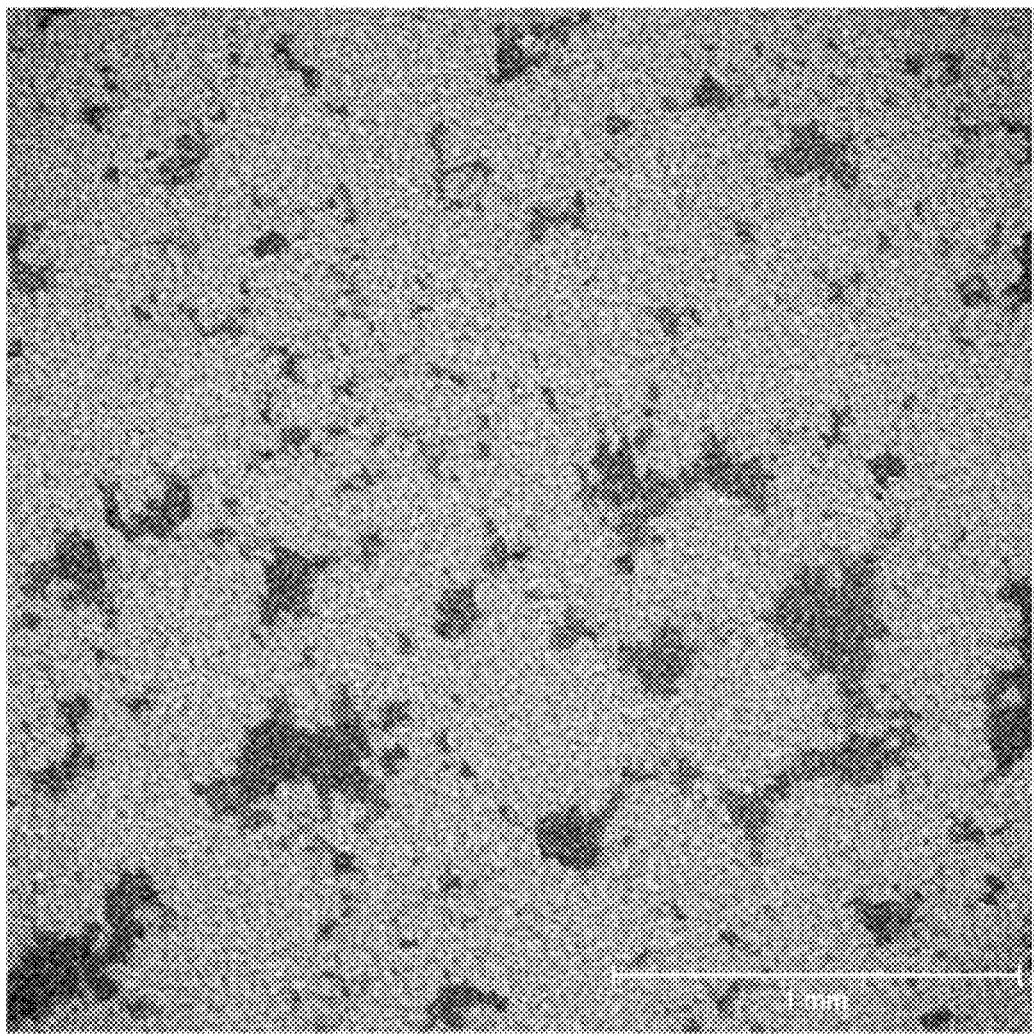
FIG. 4A is a 2D display diagram of the extracted REV.
Figure 4B:
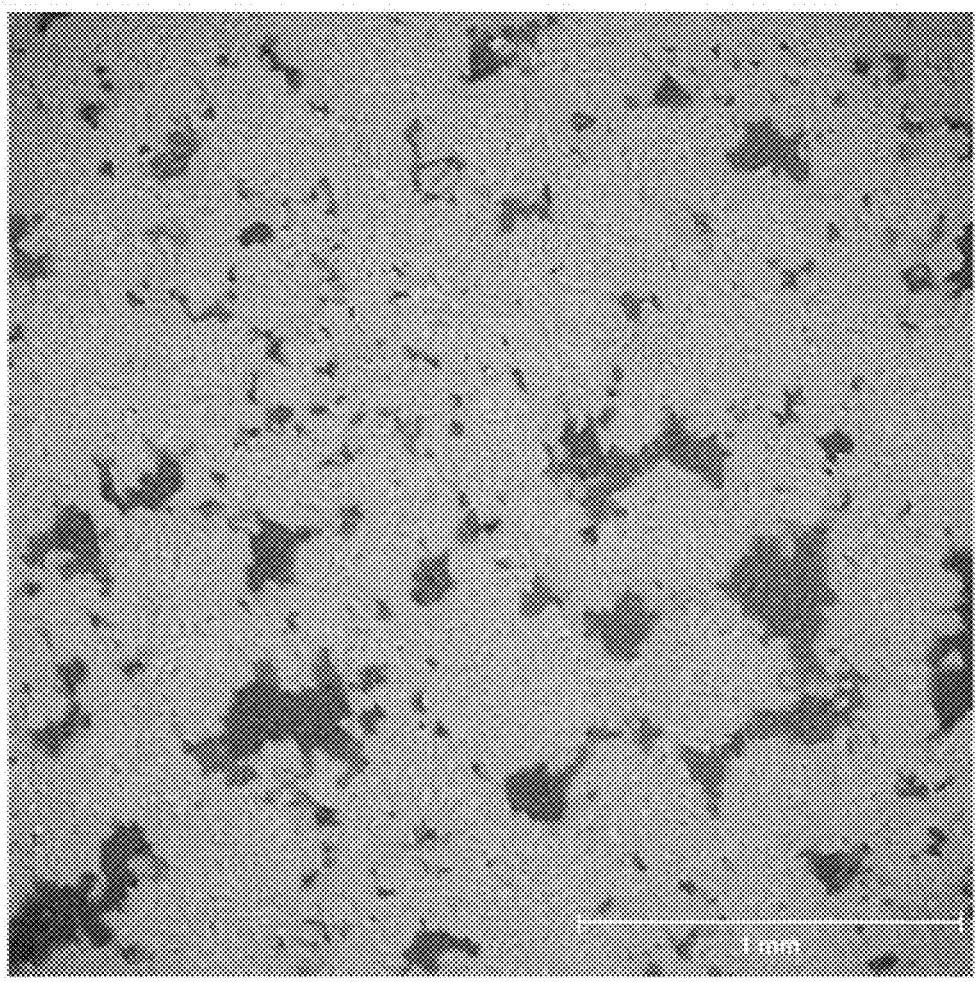
FIG. 4B is a 2D display diagram of a smoothed REV.

(2) Extract a representative elementary volume (REV) from the center of the grayscale image of the known rock, and smooth the REV to obtain a smooth digital rock image. This step may be specifically as follows: extract a 400*400*400-pixel REV in the center of the 3D grayscale image of the rock to improve a calculation speed for later simulation. FIG. 3A is a diagram of extracting the 400*400*400-pixel REV. FIG. 3B is a 3D display diagram of the extracted REV. FIG. 4A is a 2D display diagram of the extracted REV. A non-local means method was used to smooth the REV to improve the color contrast at the edge of the pore and the matrix of the rock, so that the pore and skeleton of the rock can be more clearly distinguished in a next step. FIG. 4B is a 2D display diagram of the smoothed REV. FIG. 2A, FIG. 2B, FIG. 3A, FIG. 3B, FIG. 4A, and FIG. 4B are grayscale images.

Figure 5:
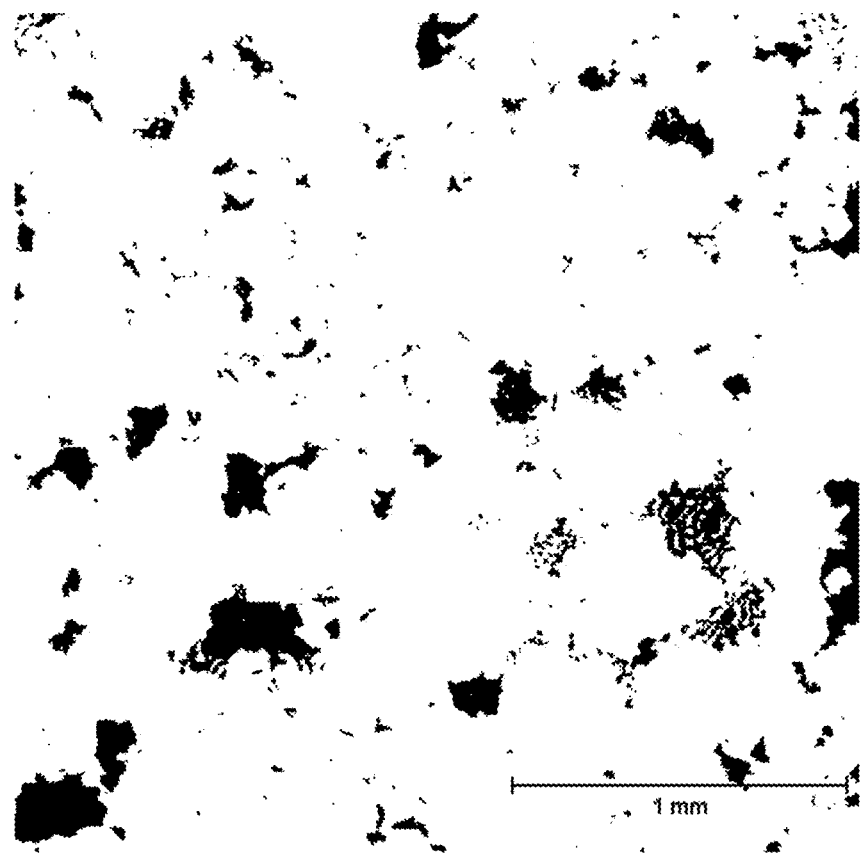
FIG. 5 is a 2D display diagram of a segmented REV according to an embodiment of the present disclosure.

(3) Segment the smooth digital rock image using a watershed segmentation method to obtain the digital rock training image. Specifically, a threshold-based watershed segmentation method is used to conduct the segmentation based on grayscale values of the pore and the matrix. FIG. 5 is a 2D display diagram of the segmented REV. In FIG. 5, the pore is black, and the matrix is white. In FIG. 2 to FIG. 5, 1 mm represents a unit size of an image. The digital rock training image was saved as a 3D .tif file.

Step 102: segment the digital rock training image into a plurality of sub-samples, and store all the sub-samples as a sample set. Step 102 specifically includes the following: 1. set a step size to 16 pixels and a sub-sample size to 64*64*64 pixels to ensure that each digital rock training image contains several complete particles, and segment the digital rock training image saved in .tif format by step to generate 10,648 sub-samples; and 2. store the 10,648 sub-samples as a sample set in .hdf5 formal to facilitate reading the sample set during training in step 103.

Step 103: train a generative adversarial network (GAN) using the sample set and a random sample noise to obtain a digital rock construction model. The digital rock construction model is the GAN trained using the sample set and the random sample noise, and the digital rock construction model is configured to construct a target digital rock image.

Step 103 particularly includes the following:
1. Obtain an activation function and a loss function of the GAN. The GAN includes a generator network and a discriminator network. The discriminator network includes a discriminator input layer, discriminator intermediate layers, and a discriminator output layer. The generator network includes a generator input layer, generator intermediate layers, and a generator output layer. The generator input layer is a fully connected layer. The generator intermediate layers are three micro-step convolutional layers. The generator output layer is a micro-step convolutional layer. The input of the generator network is random sample noise z, and output is image data. The discriminator serves as a binary classifier, and the output of the discriminator output layer is in the range of (0,1). The input of the discriminator network is an image, and the output is a probability that the input image is a real image, that is, a real or fake probability value, which is also the output value of the discriminator output layer.

The activation function includes an activation function of the discriminator intermediate layer, an activation function of the discriminator output layer, an activation function of the generator intermediate layer, and an activation function of the generator output layer. The activation function of the discriminator intermediate layer is a LeakyReLu activation function. The activation function of the discriminator output layer is a Sigmoid activation function. The activation function of the generator intermediate layer is a ReLu activation function. The activation function of the generator output layer is a Tanh activation function. The loss function includes a discriminator loss function of the discriminator network and a generator loss function of the generator network. The discriminator loss function of the discriminator network is as follows:

$$\text{Loss\_D} = lg(D(a,\alpha)) - lg(1 - D(G(z,\theta),\alpha)) \qquad (1)$$

Where, Loss_D denotes the discriminator loss function, $D(\cdot)$ denotes a discriminator network model, x denotes the sub-sample, a denotes a discriminator network parameter, $G(\cdot)$ denotes the generator network, z denotes the random sample noise, and $\theta$ denotes generator network parameters. The discriminator network parameter is the discriminator gradient of each layer of the discriminator network. The generator network parameter is the generator gradient of each layer of the generator network.

The generator loss function of the generator network is as follows:

$$\text{Loss\_G} = lg(1 - D(G(z,\theta))) \qquad (2)$$

Where, Loss_G denotes the generator loss function, and $G(\cdot)$ denotes the generator network.

2. Input the random sample noise into the generator network to obtain a fake sample set, where the fake sample set includes a plurality of first fake digital rock images. This step is specifically as follows: first, initialize the generator network, and keep the generator network parameter constant; then input the random sample noise into the initialized generator network to generate the plurality of first fake digital rock images; and finally, store the plurality of first fake digital rock images as the fake sample set. The random sample noise in this embodiment conforms to (0,1) standard normal distribution.

3. Train the discriminator network using the fake sample set and the sample set to obtain a discriminator network model. The discriminator network model is the trained discriminator network. Input of the discriminator network model is the first fake digital rock image, and output is a real or fake probability value of the first fake digital rock image. This step aims to improve the capability of the discriminator network to identify real and fake images. The sub-samples in the sample set are real images, and the first fake digital rock images in the fake sample set are lake images.

Training the discriminator network using the fake sample set and the sample set to obtain a discriminator network model specifically includes the following:

(1) Extract N sub-samples from the sample set, and input them into the discriminator network to calculate a first discriminator loss function. In this embodiment, N=128. N is usually a power of 2, which can improve calculation efficiency. The first discriminator loss function Loss_1 was calculated according to formula (3):

$$\text{Loss\_1} = lg(D(x,\alpha)) \qquad (3)$$

(2) Calculate the first discriminator gradient of each layer of the discriminator network using the first discriminator loss function. Calculating the discriminator gradient of each layer of the discriminator network includes the following: first, calculate net input $z_D^{(l)}$ and an activation value $a_D^{(l-1)}$ of each layer, and calculate an error term of the last layer using the net input and the activation value of the last layer; then calculate an error term of the penultimate layer using the error term of the last layer, calculate an error term of a previous layer through backpropagation from back to front until the first layer to obtain an error term of each layer, and calculate weight and bias of each layer of the discriminator network using the error term to obtain discriminator network parameters; and finally calculate a partial derivative of the first discriminator loss function with respect to the discriminator network parameters to obtain the first discriminator gradient of each layer. The discriminator network parameters were calculated and/or updated according to formula (4). Specifically, the weight of each layer was calculated and/or updated according to formula (5), and the bias of each layer was calculated and/or updated according to formula (6):

$$\alpha = \alpha - \frac{\partial \text{Loss\_D}}{\partial \alpha} \times lr \qquad (4)$$

$$W_D^{(l)} = W_D^{(l)} - \frac{\partial \text{Loss\_D}}{\partial W_D^{(l)}} \times lr = W_D^{(l)} - lr \times \delta_D^{(l)}\left(a_D^{(l-1)}\right)^T \qquad (5)$$

$$b_D^{(l)} = b_D^{(l)} - \frac{\partial \text{Loss\_D}}{\partial b_D^{(l)}} \times lr = b_D^{(l)} - lr \times \delta_D^{(l)} \qquad (6)$$

In the formulas, lr denotes an initial learning rate; $W_D^{(l)}$ denotes the weight of the lth layer of the discriminator network; $\delta_D^{(l)}$ denotes the error term of the lth layer of the discriminator network, that is, impact of neurons at the lth layer on a final loss; $a_D^{(l-1)}$ denotes the activation value of the (l-1)th layer of the discriminator network, that is, a result obtained after the activation function is applied to the net input; $b_D^{(l)}$ denotes the bias of the lth layer of the discriminator network; T denotes transposition, and l denotes the number of layers of the discriminator network. The discriminator network includes the discriminator input layer, the discriminator intermediate layers, and the discriminator output layer.

(3) Extract N first fake digital rock images front the fake sample set, and input them into the discriminator network to calculate a second discriminator loss function. The second discriminator loss function Loss_2 was calculated according to formula (7).

$$\text{Loss\_2} = lg(1 - D(G(z,\theta))) \qquad (7)$$

(4) Calculate a second discriminator gradient of each layer of the discriminator network using the second discriminator loss function. A specific calculation method is similar to the step of "calculating a first discriminator gradient of each layer of the discriminator network using the first discriminator loss function".

(5) Add the first discriminator loss function and the second discriminator loss function to obtain the discriminator loss function.

(6) Optimize the discriminator loss function using the first discriminator gradient, the second discriminator gradient, and a mini-batch gradient descent algorithm to obtain optimal discriminator network parameters, and obtain the discriminator network model based on the optimal discriminator network parameters. The discriminator network parameters are the weight and the bias of each layer of the discriminator network. This step specifically includes the following: optimize the discriminator loss function using an Adam optimizer and the mini-batch gradient descent algorithm; set an initial betas parameter betas=(0.5, 0.999) of the Adam optimizer and an initial learning rate lr–0.00001; determine discriminator network parameters corresponding to the maximum discriminator loss function as the optimal discriminator network parameters, and save the optimal discriminator network parameters: and determine a discriminator network corresponding to the maximum discriminator loss function as the discriminator network model.

4. Use the random sample noise as input, and train the generator network using the discriminator network model to obtain a generator network model. The generator network model is the trained generator network. The output of the generator network model is the target digital rock image. The discriminator network model and the generator network model constitute the digital rock construction model.

Using the random sample noise as input, and training the generator network using the discriminator network model to obtain a generator network model specifically includes the following:

(1) Input the random sample noise into the generator network to generate a first fake sample. Specifically, in this embodiment, a 512*1*1*1-pixel random sample noise z was input into the generator network to generate a 1*64*64*64-pixel first fake sample.

(2) Input the first fake sample into the discriminator network model, and calculate a first loss function Loss_S1 according to formula (8):

$$\text{Loss\_S1} = lg(D(G(z,\theta)),\alpha)) \qquad (8)$$

In the formula. D(•) denotes the discriminator network model, G(•) denotes the generator network, z denotes the random sample noise, θ denotes the generator network parameter, and α denotes the discriminator network parameter.

(3) Calculate the generator gradient of each layer of the generator network using the first loss function. Calculating the generator gradient of each layer of the generator network includes the following: first, calculate net input $z_G^{(i)}$ and an activation value $a_G^{(i-1)}$ of each layer, and calculate an error term of the last layer using the net input and the activation value of the last layer: then calculate an error term of the penultimate layer using the error term of the last layer, calculate an error term of a previous layer through backpropagation from back to front until the first layer to obtain an error term of each layer, and calculate weight and bias of each layer of the generator network using the error term to obtain generator network parameters: and finally calculate a partial derivative of the generator loss function (or the first loss function) with respect to the generator network parameters to obtain the generator gradient of each layer. The generator network parameters were calculated according to formula (9). Specifically, the weight of each layer was calculated according to formula (10), and the bias of each layer was calculated according to formula (11).

$$\theta = \theta - \frac{\partial \text{Loss\_G}}{\partial \theta} \times lr \qquad (9)$$

$$W_G^{(i)} = W_G^{(i)} - \frac{\partial \text{Loss\_G}}{\partial W_G^{(i)}} \times lr = W_G^{(i)} - lr \times \delta_G^{(i)}\left(a_G^{(i-1)}\right)^T \qquad (10)$$

-continued $$b_G^{(i)} = b_G^{(i)} - \frac{\partial \text{Loss\_G}}{\partial b_G^{(i)}} \times lr = b_G^{(i)} - lr \times \delta_G^{(i)} \qquad (11)$$

In the formula, lr denotes an initial learning rate; $W_G^{(i)}$ denotes the weight of the ith layer of the generator network; $\delta_G^{(i)}$ denotes the error term of the ith layer of the generator network, that is, impact of neurons at the ith layer on a final loss: $a_G^{(i-1)}$ denotes the activation value of the (i−1)th layer of the generator network, that is, a result obtained after the activation function is applied to the net input; $b_G^{(i)}$ denotes the bias of the ith layer of the generator network; T denotes transposition; and i denotes the number of layers of the generator network. The generator network includes the generator input layer, the generator intermediate layers, and the generator output layer.

(4) Optimize the generator loss function using the generator gradient and the mini-batch gradient descent algorithm; go back to the step of "input the random sample noise into the generator network to generate a first fake sample" for iteration until the number of iterations reaches a predetermined value or a real or fake probability value of the discriminator network model is a predetermined real or fake probability value; when the number of iterations reaches the predetermined value or the real or fake probability value is the predetermined real or fake probability value, determine corresponding generator network parameters as optimal generator network parameters; and obtain the generator network model based on the optimal generator network parameters, where the generator network parameters are the weight and the bias of each layer of the generator network. This step specifically includes the following; optimize the generator loss function using the Adam optimizer and the mini-batch gradient descent algorithm, where the optimizing the generator loss function is specifically maximizing the generator loss function or minimizing the first loss function; set an initial betas parameter betas=(0.5, 0.999) of the Adam optimizer and an initial learning rate lr=0.00001; go back to the step of "input the random sample noise into the generator network to generate a first fake sample" for iteration until the number of iterations reaches the predetermined value or the real or fake probability value of the discriminator network model is the predetermined real or fake probability value, where in this embodiment, the predetermined real or fake probability value is close or equal to 0.5; determine the corresponding generator network parameters when the number of iterations reaches the predetermined value or the real or fake probability value is the predetermined real or fake probability value as the optimal generator network parameters, and save the optimal generator network parameters; and determine a generator network corresponding to the optimal generator network parameters as the generator network model. When the number of iterations reaches the predetermined value, but the real or fake probability value is not equal to the predetermined real or fake probability value, the number of iterations is increased. When the real or fake probability value is equal to the predetermined real or fake probability value, but the number of iterations does not reach the predetermined value, the iteration is stopped early. In this embodiment, the optimal generator network parameters are saved in .pth format to facilitate subsequently reading parameter data for constructing the target digital rock image. Because N samples are selected for a training process, the loss function needs to be averaged when being calculated. Therefore, all loss functions in the foregoing steps are average loss functions.

Step 104; obtain a target random noise.

Figure 6A:
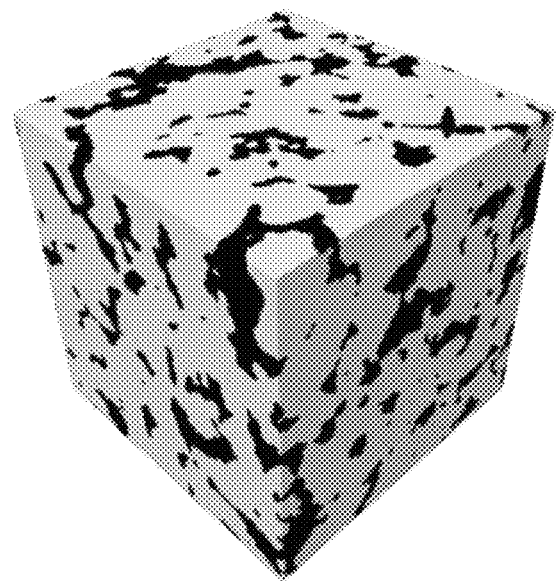
FIG. 6A is a 3D display diagram of a constructed 400*400*400-pixel target digital rock image.
Figure 6B:
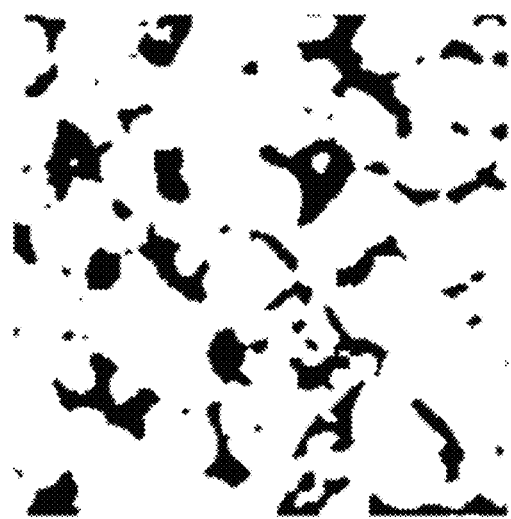
FIG. 6B is a 2D display diagram of the constructed 400*400*400-pixel target digital rock image.

Step 105: input the target random noise into the digital rock construction model to obtain the target digital rock image. Step 105 specifically includes the following: first, set a size of the to-be-constructed target digital rock image, that is, set an image size, and then input the target random noise into the generator network model in the digital rock construction model to obtain the target digital rock image. Target digital rock images of different sizes can be constructed by adjusting the image size. FIG. 6 illustrates a 400*400*400-pixel target digital rock image constructed according to this embodiment. FIG. 6A is a 3D display diagram of the target digital rock image. FIG. 6B is a 2D display diagram of the target digital rock image.

Figure 7:
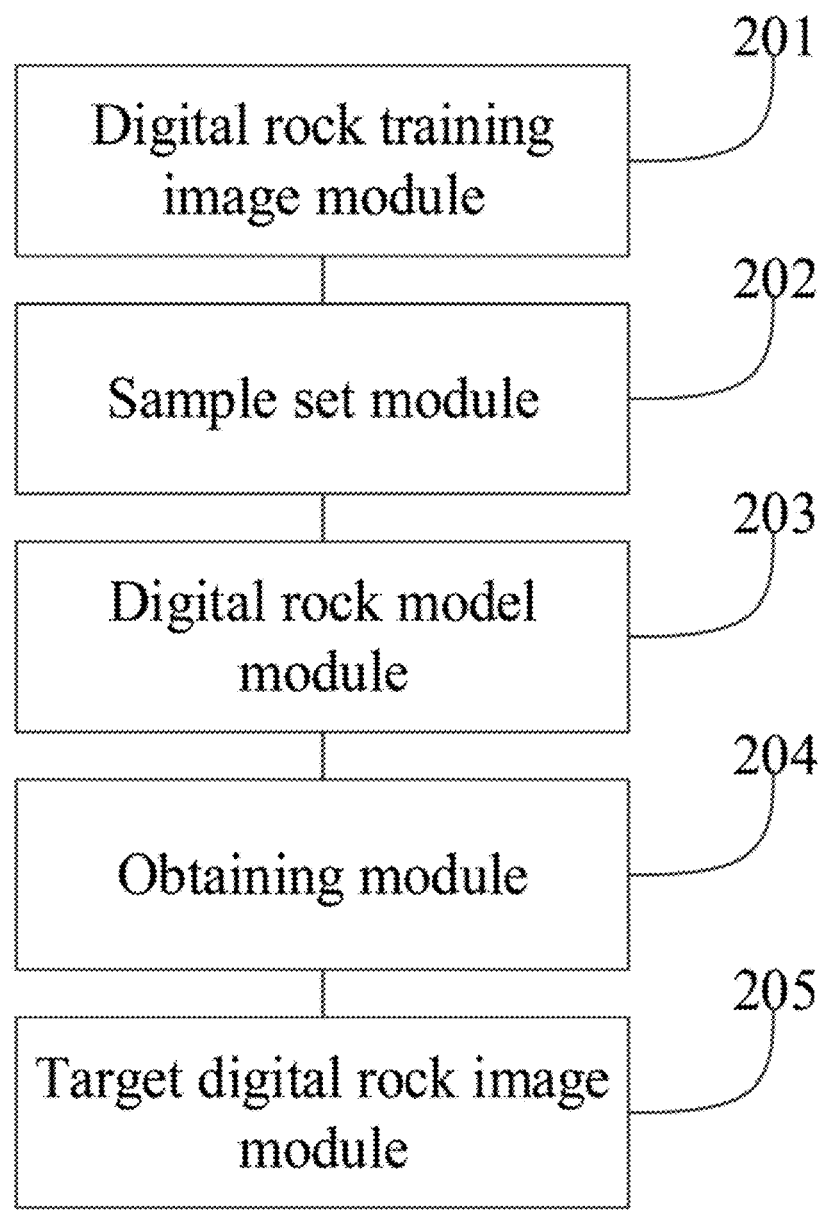
FIG. 7 is a structural diagram of a system for constructing a digital rock according to an embodiment of the present disclosure.

An embodiment provides a system for constructing a digital rock. FIG. 7 is a structural diagram of a system for constructing a digital rock according to an embodiment of the present disclosure. Referring to FIG. 7, the system for constructing a digital rock includes a digital rock training image module 201, a sample set module 202, a digital rock model module 203, an obtaining module 204, and a target digital rock image module 205.

The digital rock training image module 201 is configured to obtain a digital rock training image. The digital rock training image is a digital rock sample image of a known rock.

The digital rock training image module 201 specifically includes a scanning unit, a smoothing unit, and a segmentation unit.

The scanning unit is configured to scan the known rock using an image scanning technology to obtain a grayscale image of the known rock. The image scanning technology includes using devices such as a computed tomography (CT) scan device and a focused ion beam scanning electron microscope (FIB-SEM) to conduct image scanning. A scanning resolution in this embodiment is p micrometers (μm). The grayscale image of the rock includes a 2D grayscale image of the rock and a 3D grayscale image of the rock.

The smoothing unit is configured to extract a representative elementary volume (REV) from the center of the grayscale image of the known rock, and smooth the REV to obtain a smooth digital rock image.

The segmentation unit is configured to segment the smooth digital rock image using a watershed segmentation method to obtain the digital rock training image.

The sample set module 202 is configured to segment the digital rock training image into a plurality of sub-samples, and store all the sub-samples as a sample set.

The digital rock model module 203 is configured to train a generative adversarial network (GAN) using the sample set and a random sample noise to obtain a digital rock construction model. The digital rock construction model is the GAN trained using the sample set and the random sample noise. The digital rock construction model is configured to construct a target digital rock image.

The digital rock model module 203 specifically includes an obtaining unit, a fake sample set unit, a discriminator network model unit, and a digital rock construction model unit.

The obtaining unit is configured to obtain an activation function and a loss function of the GAN. The GAN includes a generator network and a discriminator network. The discriminator network includes a discriminator input layer, discriminator intermediate layers, and a discriminator output layer. The generator network includes a generator input layer, generator intermediate layers, and a generator output layer. The generator input layer is a fully connected layer. The generator intermediate layers are three-layer micro-step convolutional layers. The generator output layer is a micro-step convolutional layer. The input of the generator network is random sample noise z, and output is image data. The discriminator serves as a binary classifier, and the output of the discriminator output layer is in the range of (0,1). The input of the discriminator network is an image, and output is a probability that the input image is a real image, that is, a real or fake probability value, which is also the output value of the discriminator output layer. The activation function includes an activation function of the discriminator intermediate layer, an activation function of the discriminator output layer, an activation function of the generator intermediate layer, and an activation function of the generator output layer. The activation function of the discriminator intermediate layer is a LeakyReLu activation function. The activation function of the discriminator output layer is a Sigmoid activation function, the activation function of the generator intermediate layer is a ReLu activation function. The activation function of the generator output layer is a Tanh activation function. The loss function includes a discriminator loss function of the discriminator network and a generator loss function of the generator network.

The fake sample set unit is configured to input the random sample noise into the generator network to obtain a fake sample set. The fake sample set includes a plurality of first fake digital rock images. The fake sample set unit is specifically configured to: first, initialize the generator network, and keep the generator network parameter constant; then input the random sample noise into the initialized generator network to generate the plurality of first fake digital rock images; and finally, store the plurality of first fake digital rock images as the fake sample set. The random sample noise in this embodiment conforms to (0,1) standard normal distribution.

The discriminator network model unit is configured to train the discriminator network using the fake sample set and the sample set to obtain a discriminator network model. The discriminator network model is the trained discriminator network. The input of the discriminator network model is the first fake digital rock image, and output is a real or lake probability value of the first fake digital rock image.

The discriminator network model unit specifically includes a first discriminator loss function subunit, a first discriminator gradient subunit, a second discriminator loss function subunit, a second discriminator gradient subunit, a discriminator loss function subunit, and a discriminator network model subunit.

The first discriminator loss function subunit is configured to extract N sub-samples from the sample set, and input them into the discriminator network to calculate a first discriminator loss function. In this embodiment, N=128. N is usually a power of 2, which can improve calculation efficiency.

The first discriminator gradient subunit is configured to calculate a first discriminator gradient of each layer of the discriminator network using the first discriminator loss function.

The second discriminator loss function subunit is configured to extract N first fake digital rock images from the fake sample set, and input them into the discriminator network to calculate a second discriminator loss function.

The second discriminator gradient subunit is configured to calculate a second discriminator gradient of each layer of the discriminator network using the second discriminator loss function.

The discriminator loss function subunit is configured to add first discriminator loss function and the second discriminator loss function to obtain the discriminator loss function.

The discriminator network model subunit is configured to optimize the discriminator loss function using the first discriminator gradient, the second discriminator gradient, and a mini-batch gradient descent algorithm to obtain optimal discriminator network parameters, and obtain the discriminator network model based on the optimal discriminator network parameters. The discriminator network parameters are the weight and bias of each layer of the discriminator network. The discriminator network model subunit is specifically configured to: optimize the discriminator loss function using an Adam optimizer and the mini-batch gradient descent algorithm; set an initial betas parameter betas=(0.5, 0.999) of the Adam optimizer and an initial learning rate lr=0.00001; determine discriminator network parameters corresponding to the maximum discriminator loss function as the optimal discriminator network parameters, and save the optimal discriminator network parameters; and determine a discriminator network corresponding to the maximum updated discriminator loss function as the discriminator network model.

The digital rock construction model unit is configured to use the random sample noise as input, and train the generator network using the discriminator network model to obtain a generator network model. The generator network model is the trained generator network. The output of the generator network model is the target digital rock image. The discriminator network model and the generator network model constitute the digital rock construction model.

The digital rock construction model unit specifically includes a first fake sample subunit, a first loss function subunit, a generator gradient subunit, and a generator network model subunit.

The first fake sample subunit is configured to input the random sample noise into the generator network to generate a first fake sample.

The first loss function subunit is configured to input the first fake sample into the discriminator network model, and calculate a first loss function Loss_S1 according to formula (8):

$$\mathrm{Loss\_S1} = lg(D(G(z,\theta),\alpha)) \quad (8)$$

In the formula, D(•) denotes the discriminator network model. G(•) denotes the generator network, z denotes the random sample noise, α denotes the discriminator network parameter, and θ denotes the generator network parameter.

The generator gradient subunit is configured to calculate a generator gradient of each layer of the generator network using the first loss function.

The generator network model subunit is configured to optimize the generator loss function using the generator gradient and the mini-batch gradient descent algorithm; go back to the first fake sample subunit for iteration until the number of iterations reaches a predetermined value or a real or fake probability value of the discriminator network model is a predetermined real or fake probability value; when the number of iterations reaches the predetermined value or the real or fake probability value is the predetermined real or fake probability value, determine corresponding generator network parameters as optimal generator network parameters; and obtain the generator network model based on the optimal generator network parameters. The generator network parameters are the weight and bias of each layer of the generator network.

The obtaining module 204 is configured to obtain a target random noise.

The target digital rock image module 205 is configured to input the target random noise into the digital rock construction model to obtain the target digital rock image.

According to the method and system for constructing a digital rock provided in the embodiments, a digital rock image of a real porous medium can be established based on the image scanning technologies such as the CT scan technology and the FIB-SEM. Compared with images obtained using other numerical reconstruction methods, the image is more authentic and representative. According to the digital rock technologies, the real porous medium is converted into a data volume that can be recognized by a computer. On this basis, reservoir space in shapes of, for example, micro-fractures, can be added, making it possible to conduct simulation research on a micro-seepage mechanism. After the GAN model training, hyperparameters, that is, the discriminator network parameter a and the generator network parameter θ are saved. A large number of target digital rock images can be generated quickly by changing only the target random noise later. This improves efficiency and reduces calculation time and costs. During the GAN model training, the training samples are obtained from a 3D data volume (3D image) of a real digital rock established using the image scanning technologies such as the CT scan technology and the FIB-SEM. The digital rock of the real porous medium can be established using the image scanning technologies such as the CT scan technology and the FIB-SEM, and the real nature and high precision of the porous medium are preserved. Therefore, the digital rock image established based on the GAN model (digital rock construction model) has high authenticity and precision.

For the system disclosed in the embodiment, since the system corresponds to the method disclosed in the embodiment, the description is relatively simple, and reference can be made to the method description.

In this specification, several specific examples are used for illustration of the principles and implementations of the present disclosure. The description of the foregoing embodiments is used to help understand the method of the present disclosure and the core ideas thereof. In addition, a person of ordinary skill in the art can make various modifications in terms of specific implementations and scope of application in accordance with the ideas of the present disclosure. In conclusion, the content of the present specification shall not be construed as a limitation to the present disclosure.

The above embodiments are provided merely for describing the present disclosure and are not intended to limit the scope of the present disclosure. The scope of the present disclosure is defined by the appended claims. Various equivalent replacements and modifications made without departing from the spirit sand scope of the present disclosure should fall within the scope of the present disclosure.

What is claimed is:

1. A method for constructing a digital rock, comprising:
   obtaining a digital rock training image, wherein the digital rock training image is a digital rock sample image of a known rock;
   extracting a plurality of sub-samples from the digital rock training image, and storing all the sub-samples as a sample set;
   training a generative adversarial network (GAN) using the sample set and a random sample noise to obtain a digital rock construction model, wherein the digital rock construction model is the GAN trained using the sample set and the random sample noise, and the digital rock construction model is configured to construct a target digital rock image;
   obtaining a target random noise; and
   inputting the target random noise into the digital rock construction model to obtain the target digital rock image,
   wherein obtaining a digital rock training image comprises:
   scanning the known rock using an image scanning technology to obtain a grayscale image of the known rock;
   extracting a representative elementary volume (REV) from the center of the grayscale image of the known rock, and smoothing the REV to obtain a smooth digital rock image; and
   segmenting the smooth digital rock image using a watershed segmentation method to obtain the digital rock training image.

2. The method for constructing a digital rock according to claim 1, wherein the training a GAN using the sample set and a random sample noise to obtain a digital rock construction model comprises:
   obtaining an activation function and a loss function of the GAN, wherein the GAN comprises a generator network and a discriminator network;
   inputting the random sample noise into the generator network to obtain a fake sample set, wherein the fake sample set comprises a plurality of first fake digital rock images;
   training the discriminator network using the fake sample set and the sample set to obtain a discriminator network model, wherein the discriminator network model is the trained discriminator network, an input of the discriminator network model is the first fake digital rock image, and an output is a real or fake probability value of the first fake digital rock image; and
   using the random sample noise as input, and training the generator network using the trained discriminator network model to obtain a generator network model, wherein the generator network model is the trained generator network, the output of the generator network model is the target digital rock image, and the discriminator network model and the generator network model constitute the digital rock construction model.

3. The method for constructing a digital rock according to claim 2, wherein the discriminator network comprises a discriminator input layer, discriminator intermediate layers, and a discriminator output layer;
   the generator network comprises a generator input layer, generator intermediate layers, and a generator output layer, wherein the generator input layer is a fully connected layer, and the generator intermediate layers and the generator output layer are both micro-step convolutional layers;
   the activation function comprises an activation function of the discriminator intermediate layer, an activation function of the discriminator output layer, an activation function of the generator intermediate layer, and an activation function of the generator output layer; the activation function of the discriminator intermediate layer is a LeakyReLu activation function, the activation function of the discriminator output layer is a Sigmoid activation function, the activation function of the generator intermediate layer is a ReLu activation function, and the activation function of the generator output layer is a Tanh activation function, and the loss function comprises a discriminator loss function of the discriminator network and a generator loss function of the generator network.

4. The method for constructing a digital rock according to claim 3, wherein the training the discriminator network using the fake sample set and the sample set to obtain a discriminator network model comprises:

extracting N sub-samples from the sample set, and inputting the N sub-samples into the discriminator network to calculate a first discriminator loss function;

calculating a first discriminator gradient of each layer of the discriminator network using the first discriminator loss function;

extracting N first fake digital rock images from the fake sample set, and inputting the N first fake digital rock images into the discriminator network to calculate a second discriminator loss function;

calculating a second discriminator gradient of each layer of the discriminator network using the second discriminator loss function;

adding the first discriminator loss function and the second discriminator loss function to obtain the discriminator loss function; and optimizing the discriminator loss function using the first discriminator gradient, the second discriminator gradient, and a mini-batch gradient descent algorithm to obtain optimal discriminator network parameters, and obtaining the discriminator network model based on the optimal discriminator network parameters, wherein the discriminator network parameters are a weight and bias of each layer of the discriminator network.

5. The method for constructing a digital rock according to claim 3, wherein the using the random sample noise as input, and training the generator network using the trained discriminator network model to obtain a generator network model comprises:

inputting the random sample noise into the generator network to generate a first fake sample;

inputting the first fake sample into the discriminator network model, and calculating a first loss function according to formula $Loss\_S1 = \lg(D(G(z,\theta)),\alpha)$ wherein Loss_S1 denotes the first loss function, $D(\cdot)$ denotes the discriminator network model, $G(\cdot)$ denotes the generator network, z denotes the random sample noise, $\alpha$ denotes the discriminator network parameter, and $\theta$ denotes a generator network parameter;

calculating a generator gradient of each layer of the generator network using the first loss function, and optimizing the generator loss function using the generator gradient and the mini-batch gradient descent algorithm; going back to the step of "inputting the random sample noise into the generator network to generate a first fake sample" for iteration until a number of iterations reaches a predetermined value or a real or fake probability value of the discriminator network model is a predetermined real or fake probability value; when the number of iterations reaches the predetermined value or the real or fake probability value is the predetermined real or fake probability value, determining corresponding generator network parameters as optimal generator network parameters; and obtaining the generator network model based on the optimal generator network parameters, wherein the generator network parameters are a weight and bias of each layer of the generator network.

6. A system for constructing a digital rock, comprising:

a digital rock training image module, configured to obtain a digital rock training image, wherein the digital rock training image is a digital rock sample image of a known rock, a sample set module, configured to extract a plurality of sub-samples from the digital rock training image, and store all the sub-samples as a sample set;

a digital rock model module, configured to train a generative adversarial network (GAN) using the sample set and a random sample noise to obtain a digital rock construction model, wherein the digital rock construction model is the GAN trained using the sample set and the random sample noise, and the digital rock construction model is configured to construct a target digital rock image;

an obtaining module, configured to obtain a target random noise; and a target digital rock construction module, configured to input the target random noise into the digital rock construction model to obtain the target digital rock image;

wherein the digital rock training image module comprises:

a scanning unit, configured to scan the known rock using an image scanning technology to obtain a grayscale image of the known rock;

a smoothing unit, configured to extract a representative elementary volume (REV) from a center of the grayscale image of the known rock, and smooth the REV to obtain a smooth digital rock image; and a segmentation unit, configured to segment the smooth digital rock image using a watershed segmentation method to obtain the digital rock training image.

7. The system for constructing a digital rock according to claim 6, wherein the digital rock model module comprises:

an obtaining unit, configured to obtain an activation function and a loss function of the GAN, wherein the GAN comprises a generator network and a discriminator network;

a fake sample set unit, configured to input the random sample noise into the generator network to obtain a fake sample set, wherein the fake sample set comprises a plurality of fake digital rock images;

a discriminator network model unit, configured to train the discriminator network using the fake sample set and the sample set to obtain a discriminator network model, wherein the discriminator network model is the trained discriminator network, an input of the discriminator network model is the first fake digital rock image, and an output is a real or fake probability value of the first fake digital rock image; and a digital rock construction model unit, configured to use the random sample noise as input, and train the generator network using the discriminator network model to obtain a generator network model, wherein the generator network model is the trained generator network, the output of the generator network model is the target digital rock image, and the discriminator network model and the generator network model constitute the digital rock construction model.

8. The system for constructing a digital rock according to claim 7, wherein the discriminator network model unit specifically comprises:

a first discriminator loss function subunit, configured to extract N sub-samples from the sample set, and input the N sub-samples into the discriminator network to calculate a first discriminator loss function;

a first discriminator gradient subunit, configured to calculate a first discriminator gradient of each layer of the discriminator network using the first discriminator loss function;

a second discriminator loss function subunit, configured to extract N first fake-digital rock images from the fake sample set, and input the N first fake-digital rock images into the discriminator network to calculate a second discriminator loss function;

a second discriminator gradient subunit, configured to calculate a second discriminator gradient of each layer of the discriminator network using the second discriminator loss function;

a discriminator loss function subunit, configured to add the first discriminator loss function and the second discriminator loss function to obtain the discriminator loss function; and a discriminator network model subunit, configured to optimize the discriminator loss function using the first discriminator gradient, the second discriminator gradient, and a mini-batch gradient descent algorithm to obtain optimal discriminator network parameters, and obtain the discriminator network model based on the optimal discriminator network parameters, wherein the discriminator network parameters are a weight and bias of each layer of the discriminator network.

* * * * *